US011575137B2

(12) United States Patent
Li et al.

(10) Patent No.: US 11,575,137 B2
(45) Date of Patent: Feb. 7, 2023

(54) FUEL CELL STACK AND MANUFACTURING METHOD OF THE SAME

(71) Applicant: TAIYO YUDEN CO., LTD., Tokyo (JP)

(72) Inventors: Xinyu Li, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 279 days.

(21) Appl. No.: 16/684,454

(22) Filed: Nov. 14, 2019

(65) Prior Publication Data

US 2020/0168917 A1  May 28, 2020

(30) Foreign Application Priority Data

Nov. 28, 2018 (JP) .............................. JP2018-222503

(51) Int. Cl.
*H01M 8/0232* (2016.01)
*H01M 8/2425* (2016.01)
(Continued)

(52) U.S. Cl.
CPC ....... *H01M 8/0232* (2013.01); *H01M 8/0258* (2013.01); *H01M 8/2425* (2013.01);
(Continued)

(58) Field of Classification Search
None
See application file for complete search history.

(56) References Cited

U.S. PATENT DOCUMENTS 4,767,680 A * 8/1988 Hijikata .............. H01M 8/2457
429/456
6,146,780 A * 11/2000 Cisar ......................... C25B 9/65
429/435
(Continued)

FOREIGN PATENT DOCUMENTS

JP         04-075262      *  7/1990   .......... H01M 8/2432
JP      2012190746 A     10/2012
(Continued)

OTHER PUBLICATIONS

A Notice of Reasons for Refusal issued by the Japanese Patent Office, dated Sep. 6, 2022, for Japanese counterpart application No. 2018-222503. (5 pages).
(Continued)

*Primary Examiner* — Jeremiah R Smith
(74) *Attorney, Agent, or Firm* — Law Office of Katsuhiro Arai (57) ABSTRACT

A fuel cell stack includes: a first fuel cell and a second fuel cell, each of which has a structure in which a solid oxide electrolyte layer having oxygen ion conductivity is provided between two electrode layers; and an interconnector that is provided between the first fuel cell and the second fuel cell and has a separator made of a metal material, wherein the interconnector has a first metal porous part and a first gas passage on a first face of the separator on a side of the first fuel cell, wherein the interconnector has a second metal porous part and a second gas passage on a second face of the separator on a side of the second fuel cell.

12 Claims, 5 Drawing Sheets

(51) Int. Cl.
  *H01M 8/0258* (2016.01)
  *H01M 8/12* (2016.01)
  *H01M 8/026* (2016.01)
  *H01M 8/0202* (2016.01)

(52) U.S. Cl.
  CPC .......... *H01M 8/0202* (2013.01); *H01M 8/026* (2013.01); *H01M 2008/1293* (2013.01)

(56) References Cited

U.S. PATENT DOCUMENTS

| | | | | |
|---|---|---|---|---|
| 2004/0247978 | A1* | 12/2004 | Shimamune | H01M 8/1004 428/685 |
| 2005/0019642 | A1* | 1/2005 | Hishitani | H01M 8/2432 429/465 |
| 2006/0286433 | A1* | 12/2006 | Rakowski | H01M 8/021 429/455 |
| 2007/0275292 | A1* | 11/2007 | Sin Xicola | C04B 35/50 429/495 |
| 2012/0082920 | A1* | 4/2012 | Mukerjee | H01M 8/0297 429/495 |
| 2012/0129039 | A1* | 5/2012 | Drenckhahn | H01M 8/20 429/223 |
| 2013/0157166 | A1* | 6/2013 | Tsai | H01M 8/0206 429/481 |
| 2014/0170529 | A1* | 6/2014 | Jain | H01M 8/0236 252/518.1 |
| 2014/0242858 | A1 | 8/2014 | Ochiai et al. | |
| 2015/0064596 | A1* | 3/2015 | Leah | H01M 4/9033 429/465 |
| 2015/0194682 | A1* | 7/2015 | Ashary | H01M 8/0228 429/468 |
| 2017/0273769 | A1 | 9/2017 | Dengler | |
| 2018/0019493 | A1* | 1/2018 | Jakus | B28B 1/001 |
| 2019/0081331 | A1* | 3/2019 | Bauer | H01M 8/026 |

FOREIGN PATENT DOCUMENTS

| | | |
|---|---|---|
| JP | 2014163286 A | 9/2014 |
| JP | 2016039099 A | 3/2016 |
| JP | 2017525431 A | 9/2017 |
| WO | 2018042476 A1 | 3/2018 |

OTHER PUBLICATIONS

A Notice of Reasons for Refusal issued by the Japanese Patent Office, dated Dec. 6, 2022, for Japanese counterpart application No. 2018-222503 (3 pages).

* cited by examiner

FUEL CELL STACK AND MANUFACTURING METHOD OF THE SAME

CROSS-REFERENCE TO RELATED APPLICATION

This application is based upon and claims the benefit of priority of the prior Japanese Patent Application No. 2018-222503, filed on Nov. 28, 2018, the entire contents of which are incorporated herein by reference.

FIELD

A certain aspect of the present invention relates to a fuel cell stack and a manufacturing method of the fuel cell stack.

BACKGROUND

A cell having resistance to vibration and having resistance to crack in rapid temperature increasing is requested in order to develop a solid oxide fuel cell system which can be used in a vehicle. For example, there is disclosed a fuel cell having an interconnector made of a ceramic material (for example, see International Publication No. 2018-042476). However, mechanical strength and the resistance to rapid temperature increasing or decreasing of the fuel cell are low. It is therefore difficult to mount the fuel cell in a vehicle. And so, there is disclosed a fuel cell having a separator which is made by pressing a steel board (for example, see Japanese Patent Application Publication No. 2016-39099).

SUMMARY OF THE INVENTION

However, when the separator is made by pressing a steel board, the separator becomes thick. Therefore, a size of the fuel cell is enlarged.

The present invention has a purpose of providing a fuel cell stack that can be downsized and a manufacturing method of the fuel cell stack.

According to an aspect of the present invention, there is provided a fuel cell stack including: a first fuel cell and a second fuel cell, each of which has a structure in which a solid oxide electrolyte layer having oxygen ion conductivity is provided between two electrode layers; and an interconnector that is provided between the first fuel cell and the second fuel cell and has a separator made of a metal material, wherein the interconnector has a first metal porous part and a first gas passage on a first face of the separator on a side of the first fuel cell, wherein the interconnector has a second metal porous part and a second gas passage on a second face of the separator on a side of the second fuel cell.

According to another aspect of the present invention, there is provided a manufacturing method of a fuel cell stack including: preparing a multilayer structure in which a plurality of first patterns including an extinction material and metal powder are provided, on a metal powder layer, in a predetermined interval, a first electrode layer is stacked on the plurality of first patterns, an electrolyte layer is provided on the first electrode layer, a plurality of second patterns including an extinction material and metal powder are provided, under the metal powder layer, in a predetermined interval, a second electrode layer is stacked under the plurality of second patterns; and firing the multilayer structure.

DETAILED DESCRIPTION

A description will be given of an embodiment with reference to the accompanying drawings.

Figure 1:
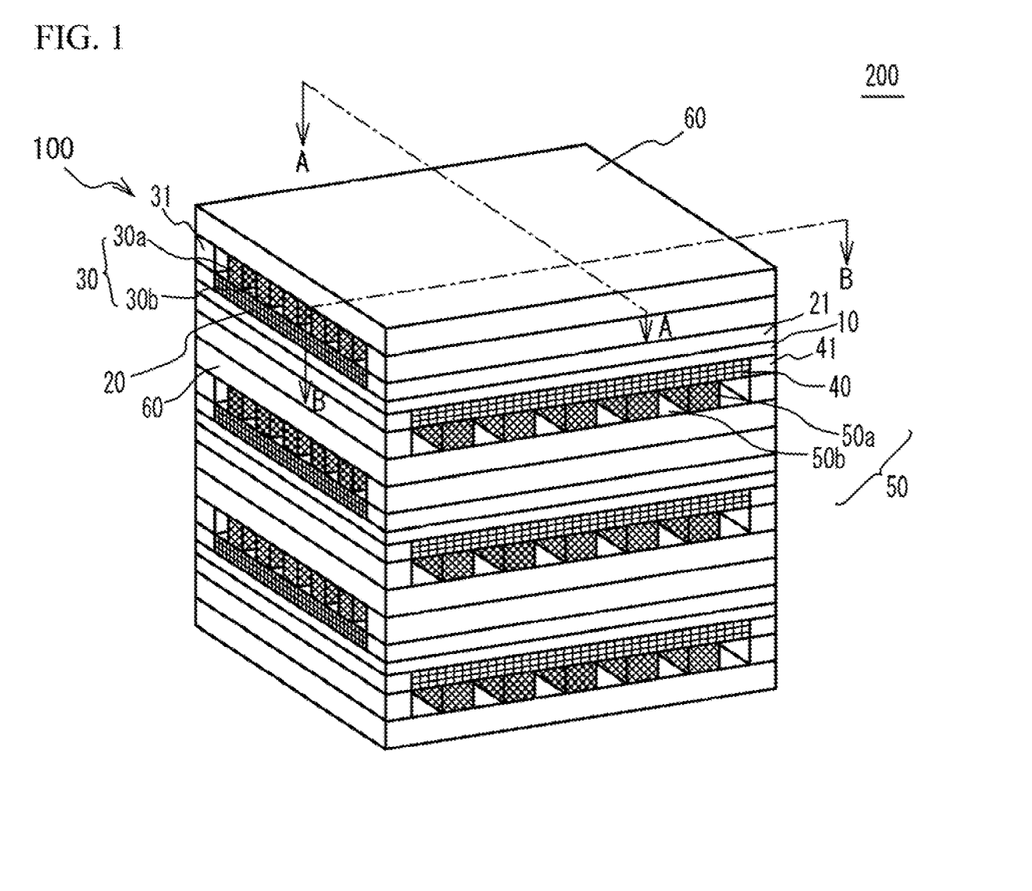
FIG. 1 illustrates an external perspective view of a fuel cell stack.

As illustrated in FIG. 1, a fuel cell stack 200 has a structure in which a plurality of fuel cells 100 are stacked. The fuel cell 100 has a structure in which a cathode 20 (first electrode layer), a first metal porous layer 30 and a separator 60 are stacked on an upper face (first face) of a solid oxide electrolyte layer 10 in this order, and an anode 40 (second electrode layer), a second metal porous layer 50 and another separator 60 are stacked on a lower face (second face) of the solid oxide electrolyte layer 10 in this order. The first metal porous layer 30 has a first metal porous part 30a and a gas passage 30b. The second metal porous layer 50 has a second metal porous part 50a and a gas passage 50b. The separator 60 is a member which is commonly used by two fuel cells 100 next to each other. A combination of the first metal porous layer 30, the separator 60 and the second metal porous layer 50 may be referred to as an interconnector. The interconnector is a member for electrically connecting cells in series. Each cell includes the solid oxide electrolyte layer 10, the cathode 20 and the anode 40. A combination of the solid oxide electrolyte layer 10, the cathode 20, the first metal porous layer 30, the anode 40 and the second metal porous layer 50 may be referred to as a unit SOFC.

The solid oxide electrolyte layer 10 is a dense layer of solid oxide electrolyte having oxygen ion conductivity. The cathode 20 is an electrode having electrode activity as a cathode. The cathode 20 has electron conductivity and oxygen ion conductivity. The anode 40 is an electrode having electrode activity as an anode. The anode 40 has electron conductivity and oxygen ion conductivity. The first metal porous layer 30 and the second metal porous layer 50 have gas permeability and support a cell part including the solid oxide electrolyte layer 10, the cathode 20 and the anode 40. The separator 60 is a dense metal layer and has gas sealing characteristic. The gas passage 30b and the gas passage 50b are voids formed by an extinction material.

The fuel cell 100 generates electrical power by the following operation. Oxidant gas including oxygen such as air is supplied to the first metal porous part 30a and the gas passage 30b. The oxidant gas reaches the cathode 20 via the first metal porous part 30a and the gas passage 30b. In the cathode 20, the oxygen in the cathode 20 reacts with an electron supplied from an external electrical circuit and becomes an oxygen ion. The oxygen ion conducts through the solid oxide electrolyte layer 10 and moves toward the anode 40. On the other hand, fuel gas including hydrogen such as hydrogen gas or reformed gas is supplied to the second metal porous part 50a and the gas passage 50b. The fuel gas reaches the anode 40 via the second metal porous part 50a and the gas passage 50b. The hydrogen in the anode 40 releases an electron, reacts with the oxygen ion having conducted through the solid oxide electrolyte layer 10 from the cathode 20, and becomes water ($H_2O$). A released electron is extracted outward by an external electrical circuit. The extracted electron electrically works, and then is supplied to the cathode 20. With the operation, the electrical power is generated.

The solid oxide electrolyte layer 10, the cathode 20, the first metal porous layer 30, the anode 40 and the second metal porous layer 50 have a rectangular shape having approximately the same size. Therefore, the solid oxide electrolyte layer 10, the cathode 20, the first metal porous layer 30, the anode 40 and the second metal porous layer 50 form a rectangular parallelepiped shape. In the rectangular parallelepiped shape, among four side faces other than an upper face and a lower face, a pair of two side faces facing with each other are referred to as a first side face and a second side face. The other pair of two side faces facing with each other are referred to as a third side face and a fourth side face. A direction in which the first side face faces with the second side face is an X-axis direction. A direction in which the third side face faces with the fourth side face is a Y-axis direction. A stacking direction of each layer is a Z-axis direction. The X-axis direction, the Y-axis direction and the Z-axis direction are vertical to each other.

Frames 21 are provided on the third side face and the fourth side face of the cathode 20. Frames 31 are provided on the third side face and the fourth side face of the first metal porous layer 30. The frames 21 and the frames 31 act as sealing members. Therefore, a passage of oxidant gas is demarcated by the frames 21, the frames 31 and the separator 60 contacting to the first metal porous layer 30. Thus, in the first metal porous layer 30, the oxidant gas moves from one of the first side face and the second side face to the other. That is, the oxidant gas moves along the X-axis direction.

Frames 41 are provided on the first side face and the second side face of the anode 40. Frames 51 are provided on the first side face and the second side face of the second metal porous layer 50. The frames 41 and the frames 51 act as sealing members. Therefore, a passage of fuel gas is demarcated by the frames 41, the frames 51 and the separator 60 contacting to the second metal porous layer 50. Thus, in the second metal porous layer 50, the fuel gas moves from one of the third side face and the fourth side face to the other. That is, the fuel gas moves along the Y-axis direction.

Figure 2:
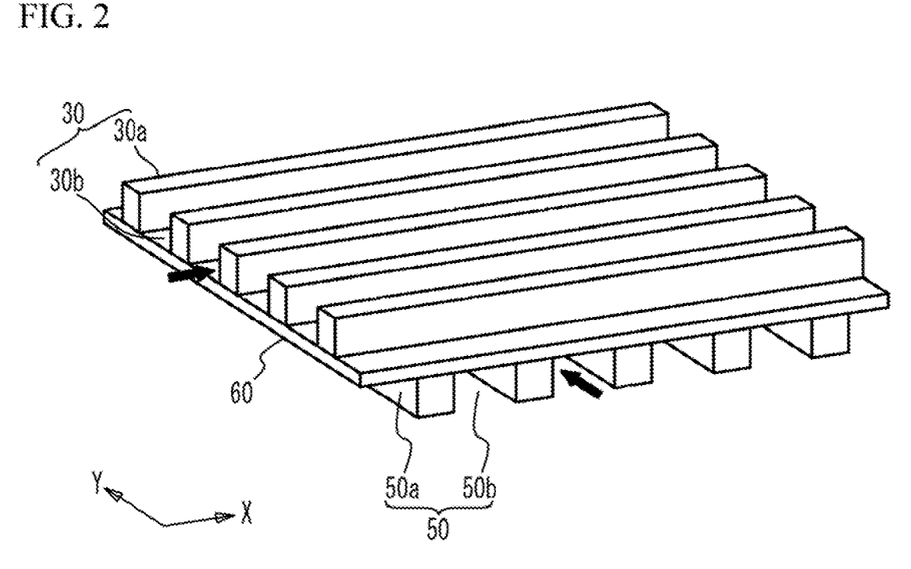
FIG. 2 illustrates a perspective view for describing details of an interconnector.

FIG. 2 illustrates a perspective view of the interconnector for describing details of the interconnector. As illustrated in FIG. 2, the interconnector has a structure in which the first metal porous layer 30 is provided on one face of the separator 60, and the second metal porous layer 50 is provided on the other face of the separator 60. The separator 60 prevents permeation of reaction gas and electrically connects two adjacent fuel cells 100 in series.

In the first metal porous layer 30, a plurality of strip-like first metal porous parts 30*a* extend along the X-axis direction. Each of the first metal porous parts 30*a* is arranged in a predetermined interval along the Y-axis direction. Therefore, the gas passage 30*b* extends in the X-axis direction, between two adjacent first metal porous parts 30*a*. The interval of the first metal porous parts 30*a* in the Y-axis direction is, for example, 500 µm to 3000 µm. The oxidant gas supplied to the first metal porous layer 30 mainly flows through the gas passage 30*b* and is supplied to the cathode 20. A part of the oxidant gas diffuses from the first metal porous part 30*a* and is supplied to the cathode 20. The first metal porous part 30*a* contacts to the cathode 20. Therefore, the first metal porous part 30*a* acts as an electrical collector and acts as a supporter.

In the second metal porous layer 50, a plurality of strip-like second metal porous parts 50*a* extend along the Y-axis direction. Each of the second metal porous parts 50*a* is arranged in a predetermined interval along the X-axis direction. Therefore, the gas passage 50*b* extends in the Y-axis direction, between two adjacent second metal porous parts 50*a*. The interval of the second metal porous parts 50*a* in the X-axis direction is, for example, 500 µm to 5000 µm. The fuel gas supplied to the second metal porous layer 50 mainly flows through the gas passage 50*b* and is supplied to the anode 40. A part of the fuel gas diffuses from the second metal porous part 50*a* and is supplied to the anode 40. The second metal porous part 50*a* contacts to the anode 40. Therefore, the second metal porous part 50*a* acts as an electrical collector and acts as a supporter.

Figure 3:
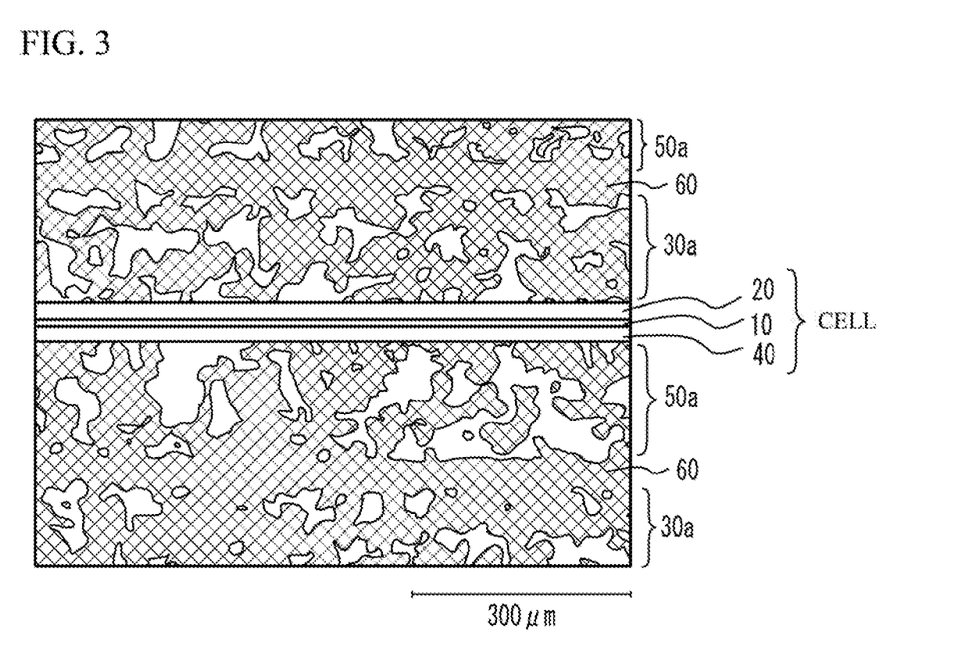
FIG. 3 schematically illustrates a cross section image of an interconnector.

FIG. 3 schematically illustrates a cross section image of the interconnector. The cross section of FIG. 3 is a cross section in which the separator 60 is sandwiched by the first metal porous part 30*a* and the second metal porous part 50*a*. As illustrated in FIG. 3, in the separator 60, a metal is densified. In the first metal porous part 30*a* and the second metal porous part 50*a*, a region in which the metal is densified and a region of a void without the metal exist together with each other. In this manner, the reaction gas can diffuse in the first metal porous part 30*a* and the second metal porous part 50*a*.

It is preferable that the separator 60 is dense so that the oxidant gas is not mixed with the fuel gas. It is therefore preferable that the dense degree of the separator 60 is high. For example, it is preferable that the dense degree of the separator 60 is 90% or more. It is more preferable that the dense degree of the separator 60 is 98% or more. It is possible to calculate the dense degree by measuring an area of the dense region and a total area of the void and the dense region from a cross section image observed by a SEM (Scanning Electron Microscopy) and calculating a ratio (the area of the dense region/the total area of the void and the dense region). It is possible to calculate porosity by calculating (the area of the void/the total area of the void and the dense region).

When the separator 60 is thick, a distance between two adjacent fuel cells 100 is large and an electrical resistance is also large. It is therefore preferable that the separator 60 is thin. For example, it is preferable that the thickness of the separator 60 is 100 µm or less. It is more preferable that the thickness is 60 µm or less. On the other hand, when the separator 60 is excessively thin, a continuous modulus of the separator 60 is small and a hole causing gas leak is easily formed. And so, it is preferable that the thickness of the separator 60 has a lower limit. For example, it is preferable that the thickness of the separator 60 is 10 µm or more. It is more preferable that the thickness is 40 µm or more. When the separator 60 is thin, the fuel cell stack 200 can be downsized.

It is preferable that the first metal porous part 30*a* and the second metal porous part 50*a* have a dense degree allowing supply of each reaction gas to the electrodes. For example, it is preferable that the dense degree of the first metal porous part 30*a* and the second metal porous part 50*a* is 80% or less. It is more preferable that the dense degree is 60% or less. On the other hand, when the dense degree of the first metal porous part 30*a* and the second metal porous part 50*a* is excessively low, adhesion between layers is low during firing and pealing may occur among the separator 60, the anode 40 and the cathode 20. And so, it is preferable that the first metal porous part 30*a* and the second metal porous part 50*a* have a lower limit. For example, it is preferable that the dense degree of the first metal porous part 30a and the second metal porous part 50a is 30% or more. It is more preferable that the dense degree is 50% or more.

When the whole of the interconnector is thick, a distance between two adjacent fuel cells 100 is large and the electrical resistance is high. It is therefore preferable that the whole of the interconnector is thin. For example, it is preferable that the total thickness of the first metal porous layer 30, the separator 60 ad the second metal porous layer 50 is 400 µm or less. It is more preferable that total thickness is 250 µm or less. When the whole of the interconnector is thin, the fuel cell stack 200 can be downsized.

The material of the interconnector is not limited when the material is a metal. It is preferable that the interconnector is made of a material of which electron conductivity on the side of the anode 40 is higher than that on the side of the cathode 20 when the oxidant gas is supplied to the gas passage 30b and the fuel gas is supplied to the gas passage 50b. For example, it is preferable that the first metal porous layer 30, the separator 60 and the second metal porous layer 50 are made of a material of which a surface is oxidized when the surface is exposed to oxygen and is converted into an oxidized film. For example, the first metal porous layer 30, the separator 60 and the second metal porous layer 50 are made of a metal such as Ni. Alternatively, it is preferable that the first metal porous layer 30, the separator 60 and the second metal porous layer 50 are made of an alloy including one or more of C, Si, Al, Nb, Mo, Y, Ce, Cr, Fe, Ti, Cu, Mn, La, W, Ni or Zr, and 10 wt % to 95 wt % of Cr, and 10 wt % or less of additive other than Fe and Cr, and the rest of the alloy is Fe component. For example, Fe-18 to 22 Cr alloy may be used. When an oxide film is formed on the surface, oxidation from the surface to inner side is suppressed.

The fuel cell 100 has a structure for suppressing crack during the firing process. In concrete, a main component of a material having electron conductivity of the cathode 20 is common with a main component of a material having electron conductivity of the anode 40. Moreover, a main component of a material having oxygen ion conductivity of the cathode 20 is common with a main component of a material having oxygen ion conductivity of the anode 40. With the structure, materials of the cathode 20 are similar to materials of the anode 40. Therefore, during removing a binder in the firing process of the cathode 20 and the anode 40, bias of the contraction stress of the cathode 20 and the anode 40 is suppressed and the crack is suppressed. It is therefore possible to form a cell part including the solid oxide electrolyte layer 10, the cathode 20 and the anode 40, by a printing technology and a one lot firing technology. Therefore, the fuel cell 100 can be downsized. When the fuel cell 100 is downsized, it is possible to increase the number of stacks. Thereby, desirable amount of electrical power can be achieved.

For example, the main component of the electron and oxygen ion conductive material used for the cathode 20 and the anode 40 is not limited. For example, it is thought that a material having both of the electron conductivity and the oxygen ion conductivity (an electron and oxygen ion conductive material) is used as the cathode 20 and the anode 40. For example, the electron and oxygen ion conductive material is such as a $LaMnO_3$-based material, a $LaCoO_3$-based material or the like. However, in the one lot firing process, metal powder of the first metal porous layer 30 and the second metal porous layer 50 are fired together with the cathode 20 and the anode 40. Therefore, it is preferable that firing atmosphere is reductive atmosphere. When the $LaMnO_3$-based material or the $LaCoO_3$-based material is used as a main component of the electron and oxygen ion conductive material, it is difficult to fire the electron and oxygen ion conductive material in a reductive atmosphere although favorable performance of generating electrical power is achieved. And so, it is preferable that the main component of the electron and oxygen ion conductive material has resistance against reduction. For example, a $CeO_2$-based material in which Gd is doped, or the like may be used as the main component of the electron and oxygen ion conductive material.

The electron and oxygen ion conductivity may be totally achieved, by using a material having electron conductivity and another material having oxygen ion conductivity, as another method. The material having the oxygen ion conductivity is not limited. For example, it is preferable that scandia yttria stabilized zirconia (ScYSZ) is used as the main component of the material having the oxygen ion conductivity. For example, it is preferable that ScYSZ having a composition range including 5 mol % to 16 mol % of scandia ($Sc_2O_3$) and 1 mol % to 3 mol % of yttria ($Y_2O_3$) is used. It is more preferable that ScYSZ of which a total amount of the scandia and the yttria is 6 mol % to 15 mol % is used. This is because the highest conductivity of oxygen ion is achieved in the range. The material having the oxygen ion conductivity is a material of which a transport number of oxygen ion is 99% or more.

Next, the material having the electron conductivity is not limited. A metal such as Ni may be used as the material having the electron conductivity. It is preferable that the material having the electron conductivity may be an alloy including one or more of C, Si, Y, Ce, Cr, Fe, Ti, Cu, Mn, La, W, Ni or Zr, and 10 wt % to 95 wt % of Cr, and 30 wt % or less of another element. In concrete, it is preferable that Fe-18 to 22 Cr alloy is used. When the metal and the material of the alloy are used, an SOFC system has large mechanical strength and has resistance against rapid temperature changing. With the characteristic, it is possible to mount the fuel system in a vehicle. When an amount of Cr is increased in the alloy, a thermal expansion coefficient of the cathode 20 and the anode 40 gets closer to a thermal expansion coefficient of the solid oxide electrolyte layer 10. Therefore, the cell has resistance against crack. Moreover, when the amount of Cr of the alloy is large, the alloy has resistance against heat. Therefore, degradation of the cell during generating electrical power is suppressed. However, for the purpose of suppressing cost and Cr poisoning in the cathode 20, it is preferable that the amount of Cr is small. Therefore, the composition of Fe-18 to 22 Cr is preferable because a balance is adequate.

A ceramic material may be used as the main component of the material having the electron conductivity used in the cathode 20 and the anode 40. For example, it is possible to use $LaCrO_3$ in which Sr is doped, or $SrTiO_3$ in which La is doped. These materials are stable in reductive atmosphere and oxidizing atmosphere. That is, these materials are stable in a large range of oxygen partial pressure. These materials hardly react with other materials (for example, electrolyte). Therefore, these materials are suitable for a manufacturing process. Stability at a high temperature of the ceramic material is superior to those of the metal and the alloy. The ceramic material is preferable in an SOFC system having high endurance. For example, the material having the electron conductivity has conductivity of 10 $S·cm^{-1}$ or more at a temperature of 400 degrees C. or more which is approximately equal to that of a metal.

The main component of the material having the oxygen ion conductivity of the cathode 20 is common with the main component of the material having the oxygen ion conductivity of the anode 40, when the material having the oxygen ion conductivity is different from the material having the electron conductivity and a plurality of materials having the oxygen ion conductivity are mixed and are used. In this case, it is preferable that the plurality of the materials having the oxygen ion conductivity of the cathode 20 are common with the plurality of the materials having the oxygen ion conductivity of the anode 40. The main component of the material having the electron conductivity of the cathode 20 is common with the main component of the material having the electron conductivity of the anode 40, when the material having the oxygen ion conductivity is different from the material having the electron conductivity and a plurality of materials having the electron conductivity are mixed and are used. In this case, it is preferable that the plurality of the materials having the electron conductivity of the cathode 20 are common with the plurality of the materials having the electron conductivity of the anode 40.

It is preferable that thicknesses of the cathode 20 and the anode 40 are 50 μm or less. It is more preferable that the thicknesses of the cathode 20 and the anode 40 are 30 μm or less. This is because a thickness of an electrode effectively contributing to electrochemical reaction when using reformed gas as fuel is approximately 30 μm, and an effective thickness of an electrode when using hydrocarbon fuel is approximately 50 μm.

The cathode 20 and the anode 40 may include catalyst. For example, Ni compound such as $Ni(NO_3)_3$ or $NiCl_3$ can be used as the catalyst of the cathode 20 and the anode 40. As a doping method of Ni, a method of impregnating solution such as $Ni(NO_3)_3$ or $NiCl_3$ after firing may be used.

It is preferable that a main component of the solid oxide electrolyte layer 10 is such as $ZrO_2$ in which 6 mol % to 15 mol % of $Sc_2O_3$ (scandia) and $Y_2O_3$ (yttria) are doped. When a total concentration of $Y_2O_3$ and $Sc_2O_3$ is 6 mol % to 15 mol %, the oxygen ion conductivity is the highest. It is therefore preferable that the material having the total concentration is used as the main component of the solid oxide electrolyte layer 10. It is preferable that the thickness of the solid oxide electrolyte layer 10 is 20 μm or less. It is more preferable that the thickness is 10 μm or less. The electrolyte layer has favorable performance when the electrolyte layer is thin. However, it is preferable that the thickness is 1 μm or more, from a viewpoint of suppressing gas leak of both sides of the electrolyte layer.

The first metal porous layer 30 and the second metal porous layer 50 are not limited. For example, a metal such as Ni may be used for the first metal porous layer 30 and the second metal porous layer 50. It is preferable that an alloy including one or more elements such as C, Si, Al, Nb, Mo, Y, Ce, Cr, Fe, Ti, Cu, Mn, La, W, Ni, Zr or the like and including 10 wt % to 95 wt % of Cr and including 10 wt % or less of additive other than Fe and Cr, in which the rest is an Fe component, is used. In concrete, Fe-18 to 22 Cr alloy may be used.

It is preferable that porosity of the first metal porous part 30a and porosity of the second metal porous part 50a are 30% or more and 70% or less. It is more preferable that the porosities are 40% or more and 60% or less. This is because gas diffusion is suppressed and generating of electrical power is suppressed, when the porosity is less than 30%. On the other hand, mechanical strength of the metal porous part is not sufficient and the metal porous part may not necessarily act as a support member of the gas passage, when the porosity is more than 70%. It is preferable that the thicknesses of the first metal porous part 30a and the second metal porous part 50a are 150 μm or less and 50 μm or more. It is more preferable that the thicknesses are 100 μm or less. When the thicknesses are small, a whole volume of the SOFC system is small and the SOFC system has advantage in downsizing. However, it is preferable that the thicknesses are 50 μm or more, from a viewpoint of securing of necessary amount of gas flow. The first metal porous layer 30 and the second metal porous layer 50 are support members for forming the gas passage. The thickness of the gas passage is approximately the same as the thicknesses of the first metal porous layer 30 and the second metal porous layer 50. An extinction material which disappears within a temperature range of 200 degrees C. to 600 degrees C. is used for the gas passage 30b and the gas passage 50b. Slurry including the extinction material is made and is printed by a line-and-space method. The extinction material is not limited. For example, an organic material such as acrylic resin may be used as the extinction material.

In the fuel cell stack 200, an interconnector made by pressing a steel board is not used. However, the interconnector, in which the first metal porous part 30a (first metal porous part) and the gas passage 30b (first gas passage) are formed on one face of the separator 60 (dense metal layer) and the second metal porous part 50a (second metal porous part) and the gas passage 50b (second gas passage) are formed on the other face of the separator 60, is used. It is possible to form the interconnector by the printing technology and the one lot firing technology. It is therefore possible to reduce the thickness of the interconnector. It is therefore possible to downsize the fuel cell stack 200.

In the fuel cell 100 made by the printing technology and the one lot firing technology, the ratio of the metal part is large. In a conventional cell, ceramics NiO is used as a supporter. However, in the embodiment, the fuel cell 100 is made by the one lot firing together with the interconnector. Therefore, a supporter is not necessary. And the volume ratio of the metal is large. For example, the volume ratio of the metal part in the fuel cell stack 200 is 70% or more. In the structure, the fuel cell stack 200 is hardly cracked, because the Young's modulus is large.

When the first metal porous part 30a and the second metal porous part 50a are sintered on the both sides of the separator 60, the adhesion between the first metal porous part 30a and the separator 60 and between the second metal porous part 50a and the separator 60 is large. It is therefore possible to effectively suppress the deformation of the structure during the rapid temperature increasing and decreasing. And, the adhesion between the interconnector and the cell part is large, when the first metal porous part 30a is sintered together with the cathode 20, and the second metal porous part 50a is sintered together with the anode 40.

A description will be given of a manufacturing method of the fuel cell stack 200.

(Making process of a material for dense metal) Metal powder (for example, 1 μm to 10 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), a binder (PVB (polyvinylbutyral), acrylic resin, ethyl cellulose and so on) are mixed. Thus, slurry is made. An extinction material is not mixed, for the purpose of making a dense layer by sintering. The material for dense metal is used as the separator 60, the frame 31 and the frame 51. A volume ratio of organic component (solid material of the binder and the plasticizer) and the metal powder is, for example, 1:4 to 1:1.

(Making process of a material for porous metal) Metal powder (for example, 10 μm to 100 μm of grain diameter), plasticizer (for example, 1 wt % to 6 wt % for the purpose of adjusting adhesion of a sheet), a solvent (20 wt % to 30 wt % of toluene, 2-propanol (IPA), 1-butanole, terpineol, butyl acetate, or ethanol, in accordance with viscosity), an extinction material (organic material), a binder (PVB, acrylic resin, ethyl cellulose or the like) are mixed. Thus, slurry is made. The material for porous metal is used as the first metal porous part 30a and the second metal porous part 50a. A volume ratio of organic component (the extinction material, solid material of the binder and the plasticizer) and the metal powder is, for example, 1:1 to 20:1. The amount of the organic components is adjusted in accordance with the porosity.

(Making process of a material for electrode layer) Powder of a material having electron conductivity (for example, 100 nm to 10 μm of grain diameter), powder of a material having oxygen ion conductivity (for example, 100 nm to 10 μm of grain diameter), catalyst (for example, Ni compound having a grain diameter of 10 nm to 1 or the like), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), an extinction material (organic material), and a binder (PVB, acrylic resin, ethyl cellulose or the like) are mixed. Thus, slurry is made. A solvent such as $Ni(NO_3)_3$ or $NiCl_3$ may be impregnated after firing, as a doping method of Ni. A volume ratio of organic component (the extinction material, solid material of the binder and the plasticizer) and the powder of the material having electron conductivity is, for example, 1:1 to 5:1. The amount of the organic components is adjusted in accordance with the porosity. A volume ratio of the powder of the material having electron conductivity and the powder of the material having oxygen ion conductivity is, for example, 3:7 to 7:3.

(Making process of a material for dense mixed layer) Powder of a material having electron conductivity (for example, 1 μm to 10 μm of grain diameter), powder of a material having oxygen ion conductivity (for example, 10 nm to 10 μm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. Neither catalyst nor an extinction material are mixed with the slurry, because the mixed layer has a purpose of sealing gas.

(Making process of a material for electrolyte layer) Powder of a material having oxygen ion conductivity (for example, ScYSZ, YSZ or the like, and 10 nm to 1000 nm of grain diameter), a solvent (20 wt % to 30 wt % of toluene, 2-propanol (IPA), 1-butanole, terpineol, butyl acetate, or ethanol, in accordance with viscosity), plasticizer (for example, 1 wt % to 6 wt % for the purpose of adjusting adhesion of a sheet), a binder (PVB, acrylic resin, ethyl cellulose or the like) are mixed. Thus, slurry is made. A volume ratio of organic component (solid material of the binder and the plasticizer) and the powder of the material having oxygen ion conductivity is, for example, 6:4 to 3:4.

(Making process of a material for gas passage) An extinction material (organic material such as acrylic resin or polyimide resin), plasticizer (for example, 1 wt % to 6 wt % for the purpose of adjusting adhesion of a sheet), a solvent (20 wt % to 30 wt % of toluene, 2-propanol (IPA), 1-buta- nole, terpineol, butyl acetate, or ethanol, in accordance with viscosity), a binder (PVB, acrylic resin, ethyl cellulose or the like) are mixed. Thus, slurry is made.

Figure 4A:
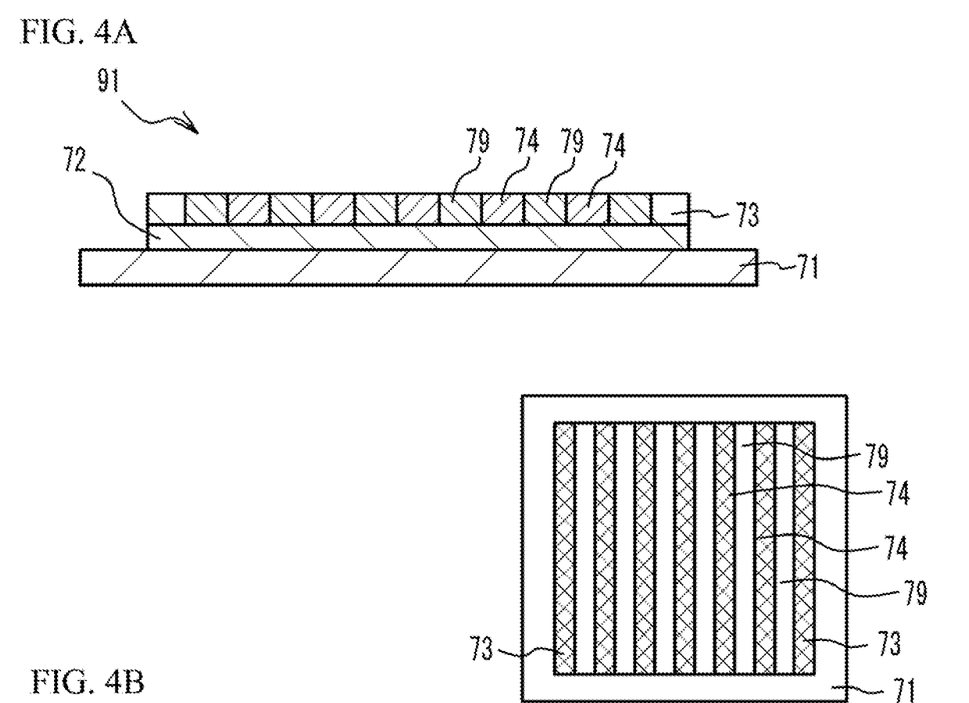
FIG. 4A and FIG. 4B illustrate a manufacturing method of a fuel cell stack.

As illustrated in an upper figure of FIG. 4A, the material for dense metal is coated on a PET (polyethylene terephthalate) film 71. And a metal powder layer 72 is formed. The metal powder layer 72 has a rectangular shape and has a thickness of 20 μm to 35 μm. For example, the metal powder layer 72 has a rectangular shape. For example, the metal powder layer 72 has a square shape of which a side has a length of 60 mm to 70 mm. Next, the material for dense metal is printed on two end portions of the metal powder layer 72 on the two side faces of the metal powder layer 72 facing with each other. Thus, two frames 73 are formed. Each of the frames 73 has a width of 1 mm to 10 mm and has a length of 60 mm to 70 mm, in accordance with accuracy of stacking and cutting. Next, the material for porous metal is printed between the two frames 73 on the metal powder layer 72. Thus, a plurality of strip-like metal powder patterns 74 are formed in a predetermined interval. Next, the material 79 for gas passage is printed as a reverse pattern with respect to the metal powder pattern 74. Therefore, the material 79 for gas passage is formed in spaces formed by the metal powder patterns 74. Thus, a first multilayer structure 91 is formed. A thickness of the frame 73 is, for example, 100 μm to 200 μm. A thickness of the metal powder pattern 74 is ±10 μm with respect to the thickness of the frame 73. A right lower figure of FIG. 4A is a top view.

Figure 4B:
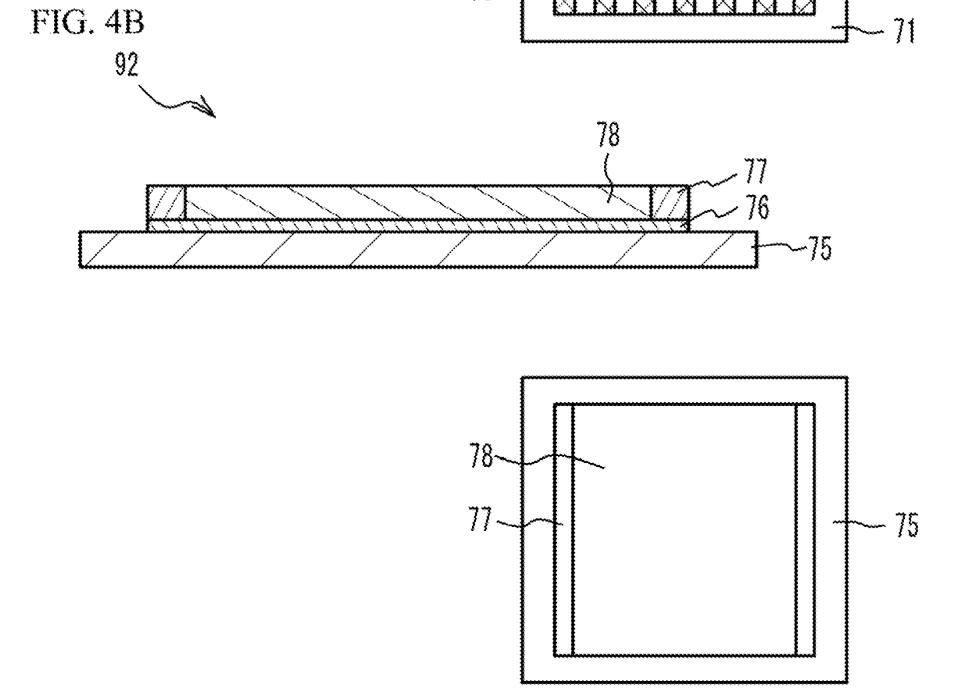

As illustrated in an upper figure of FIG. 4B, the material for electrolyte layer is coated on a PET film 75. Thus, an electrolyte layer 76 is formed. The electrolyte layer 76 has a rectangular shape which is approximately the same as the metal powder layer 72 and has a thickness of 5 μm to 15 μm. Next, the material for electrode layer is printed on end portions of the electrolyte layer 76 on the two side faces side of the dense electrolyte layer 76 facing with each other. Thus, two frames 77 are formed. The frames 77 have a width of 1 mm to 10 mm and have a length of 60 mm to 70 mm, in accordance with accuracy of stacking and cutting. Next, the material for electrode layer is printed between the two frames 77 on the electrolyte layer 76. Thus, an electrode layer 78 (a reverse pattern layer with respect to the frame 77) is formed. Thus, a second multilayer structure 92 is formed. A thickness of the frame 77 is, for example, 15 μm to 40 μm. A thickness of the electrode layer 78 is, for example, ±3 μm with respect to the thickness of the frame 77. A right lower figure of FIG. 4B is a top view.

Figure 5A:
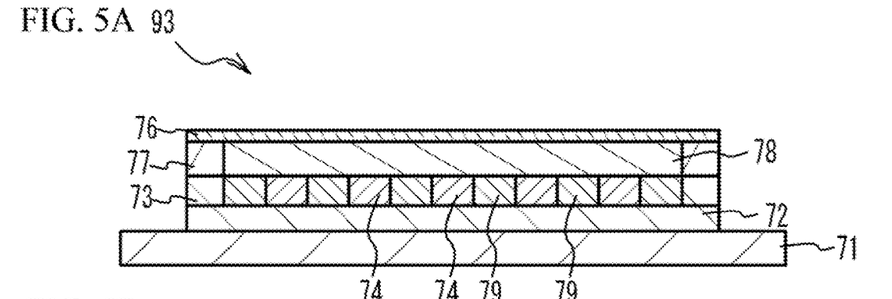
FIG. 5A to FIG. 5C illustrate a manufacturing method of a fuel cell stack.

Next, as illustrated in FIG. 5A, the first multilayer structure 91 is stacked on the second multilayer structure 92. In this case, the second multilayer structure 92 is reversed so that the electrode layer 78 is stacked on the metal powder pattern 74. And, the frame 77 is stacked on the frame 73. Thus, a third multilayer structure 93 is formed. The PET film 75 is peeled.

Figure 5B:
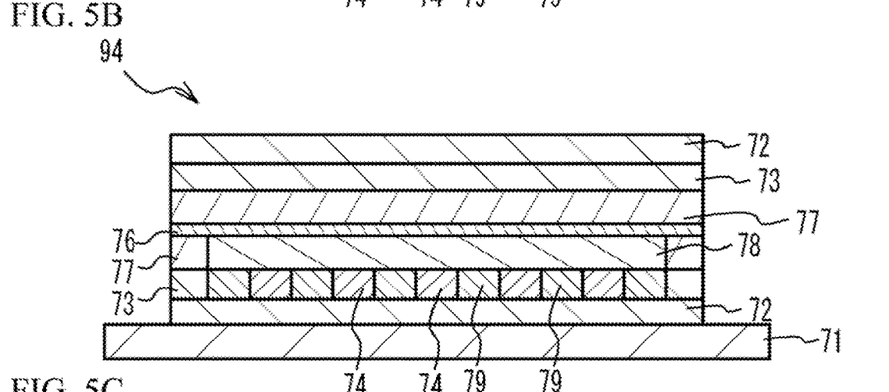

Next, as illustrated in FIG. 5B, another third multilayer structure 93 is stacked on the third multilayer structure 93 so that another electrolyte layer 76 is stacked on the electrolyte layer 76. Another third multilayer structure 93 is rotated by 90 degrees, with the two electrolyte layers 76 facing with each other. That is, side faces of the third multilayer structure 93 on which the frames 73 and the frames 77 are provided are different from side faces of another third multilayer structure 93 on which the frames 73 and the frames 77 are provided. Thus, a fourth multilayer structure 94 is formed.

Figure 5C:
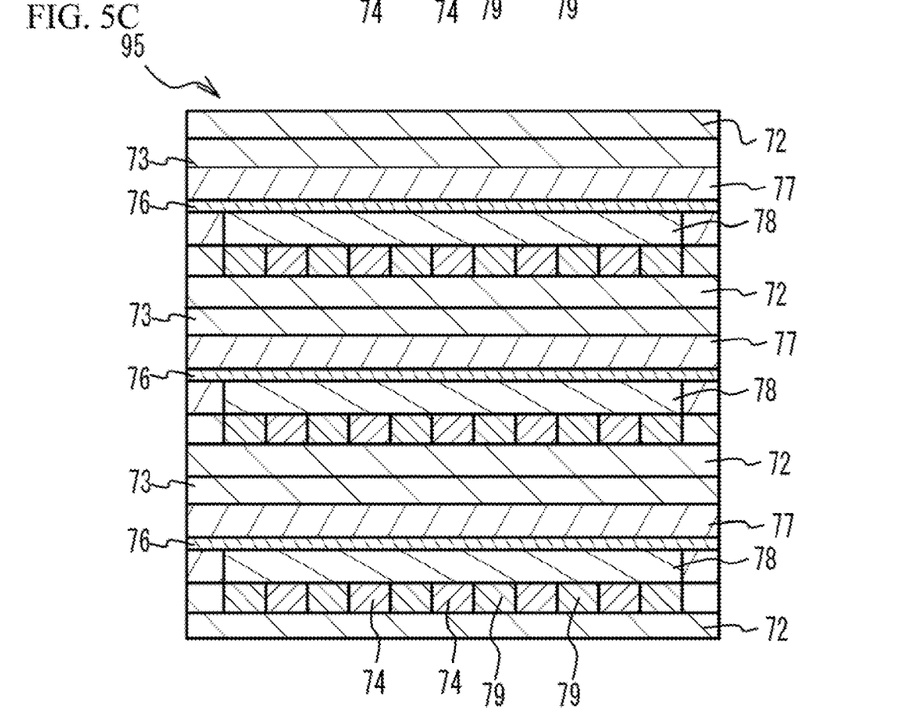

Next, the PET film 71 is peeled. And, as illustrated in FIG. 5C, a plurality of the fourth multilayer structures 94 (for example, 200) are stacked. Thus, a compact 95 is formed. In the compact 95, the electrolyte layer 76 corresponds to the solid oxide electrolyte layer 10 after firing. The electrode layer 78 on the upper face (first face) of the electrolyte layer 76 corresponds to the cathode 20 after firing. The metal powder pattern 74 on the electrode layer 78 corresponds to the first metal porous part 30a after firing. The electrode layer 78 on the lower face (second face) of the electrolyte layer 76 corresponds to the anode 40 after firing. The metal powder pattern 74 under the electrode layer 78 corresponds to the second metal porous part 50a after firing. The metal powder layer 72 corresponds to the separator 60 after firing.

The compact 95 is subjected to isostatic pressing at a pressure of 100 MPa or the like. Thereby, each layer adheres to each other. The compact 95 is cut into a square of which a side has a length of 60 mm to 65 mm. After that, the binder is removed in normal atmosphere. The organic components are slowly decomposed in a temperature range of 200 degrees C. to 700 degrees C. Therefore, the temperature is slowly increased to the temperature range of 200 degrees C. to 700 degrees C. in a week or so, in order to suppress defect of the removing of the binder. After that, the temperature is kept at 700 degrees C. for one hour or the like.

The compact 95 of which the binder is removed is supplied in a reduction firing furnace and is fired in a reductive atmosphere of 100% $H_2$, or a reductive atmosphere of 0.1% to 4% $H_2$ and Ar. A known manufacturing method of an SOFC stack by a one lot firing may be applied. That is, the firing is performed so that at least one of the metal and the ceramic material is sintered, and a desirable sintered dense structure or a sintered porous structure is formed. It is preferable that all elements are fired together with each other. For example, a heating process in a temperature range of 1200 degrees C. to 1550 degrees C. may be used. It is preferable that the temperature range is 1250 degrees C. to 1400 degrees C. A firing time within the temperature range is not limited. When the elements are slowly fired, a difference of contraction of the layers is suppressed. For example, the firing time may be a few hours to a few tens of hours. A material 79 for gas passage disappears in one of heating processes.

After that, the catalyst is impregnated into the cathode 20 and the anode 40, if necessary. Thus, the fuel cell stack 200 is manufactured. For example, when the catalyst is impregnated into the anode 40, the cathode 20 is covered with a masking tape. A solvent of nickel nitrate or nickel chloride is impregnated into the anode 40. And the anode 40 is dried. On the other hand, a solvent of precursor of nitrate to be Ag nitrate, Pr nitrate, LSM, LSC or LSCF is impregnated into the cathode 20 and is dried. After that, the fuel cell stack 200 is subjected to a heating process of 300 degrees C. to 850 degrees C. in normal atmosphere. The impregnated solvent is decomposed and is reacted with each other. Thus, a desirable catalyst is obtained.

In the manufacturing method of the embodiment, a plurality of the materials 79 for gas passage and a plurality of metal powder patterns 74 (first pattern) including metal powder are arrayed in a predetermined interval, on the metal powder layer 72. The electrode layer 78 (first electrode layer) is stacked on the plurality of metal powder patterns 74. The electrolyte layer 76 is arranged on the electrode layer 78. A plurality of the materials 79 for gas passage and the metal powder patterns (second pattern) including metal powder are arrayed in a predetermined interval, under the metal powder layer 72. The electrode layer 78 (second electrode layer) is stacked under the plurality of the metal powder patterns 74. The resulting multilayer structure is fired after that.

In the manufacturing method, the interconnector is made by the printing technology and the one lot firing technology. It is therefore possible to reduce the thickness of the interconnector. It is therefore possible to downsize the fuel cell stack 200. It is possible to enlarge the adhesion between the first metal porous part 30a and the separator 60 and between the second metal porous part 50a and the separator 60, when the first metal porous part 30a and the second metal porous part 50a are sintered on both sides of the separator 60. It is therefore possible to effectively suppress the deformation of the structure during the rapid temperature increasing and decreasing. And it is possible to enlarge the adhesion between the interconnector and the cell part, when the first metal porous part 30a is sintered together with the cathode 20, and the second metal porous part 50a is sintered together with the anode 40.

EXAMPLE

The fuel cell stack 200 was manufactured in accordance with the above-mentioned embodiment. Fe-Cr alloy powder having a diameter of 20 μm was used as the material for dense metal. Fe-Cr alloy powder having a diameter of 20 μm was used as the material for porous metal. Fe-Cr alloy powder having a diameter of 5 μm and 10Sc1YSZ powder having a diameter of 100 nm were used as the material for electrode layer. Fe-Cr alloy powder having a diameter of 5 μm and 10Sc1YSZ powder having a diameter of 100 nm were used as the material for dense mixed layer. 10Sc1YSZ powder having a diameter of 100 nm was used as the material for electrolyte layer. Acrylic resin was used as the material for gas passage. In the interconnector after the one lot firing, the separator 60 was a dense member of which porosity was 98%. The thickness of the separator 60 was 40 μm. The width of the gas passage 30b was 1 mm. The first metal porous part 30a and the gas passage 30b were designed to have a large thickness in order to allow air flow in the first metal porous part 30a and the gas passage 30b. The thickness of the gas passage 30b was 95 μm. The width of the gas passage 50b was 1 mm. The second metal porous part 50a and the gas passage 50b were designed to have a small thickness in order to allow fuel gas flow in the second metal porous part 50a and the gas passage 50b. The thickness of the gas passage 50b was 70 μm. The width of the first metal porous part 30a was 1 mm. The first metal porous part 30a had the same height as that of the gas passage 30b. The dense degree of the first metal porous part 30a was approximately 70 vol %. The width of the second metal porous part 50a was 1 mm. The second metal porous part 50a has the same height as that of the gas passage 50b. The dense degree of the second metal porous part 50a was approximately 70 vol %. The total thickness of the interconnector composed of the separator 60, the first metal porous layer 30 and the second metal porous layer 50 was 205 μm.

Although the embodiments of the present invention have been described in detail, it is to be understood that the various change, substitutions, and alterations could be made hereto without departing from the spirit and scope of the invention.

What is claimed is:

1. A fuel cell stack comprising:
a first fuel cell and a second fuel cell, each of which has a structure in which a solid oxide electrolyte layer having oxygen ion conductivity is provided between two electrode layers; and
an interconnector that is provided between the first fuel cell and the second fuel cell and has a separator made of a metal material,
wherein:
the interconnector has a first metal porous part and a first gas passage on a first face of the separator on a side of the first fuel cell,
the interconnector has a second metal porous part and a second gas passage on a second face of the separator on a side of the second fuel cell,
the separator, the first metal porous part, and the second metal porous part are constituted by a sintered structure,
one of the two electrode layers includes a first material which has oxygen ion conductivity and a second material which is different from the first material and has electron conductivity,
other of the two electrode layers includes a third material which has oxygen ion conductivity and a fourth material which is different from the third material and has electron conductivity,
a main component of the first material and a main component of the third material are identical in composition,
a main component of the second material and a main component of the fourth material are identical in composition, and
the two electrodes and the solid oxide electrolyte layer have a sintered structure.

2. The fuel cell stack as claimed in claim 1, wherein a dense degree of the separator is 90% or more.

3. The fuel cell stack as claimed in claim 1, wherein a thickness of the separator is 100 μm or less.

4. The fuel cell stack as claimed in claim 1, wherein porosity of the first metal porous part and the second metal porous part is 30% or more and 80% or less.

5. The fuel cell stack as claimed in claim 1, wherein the first metal porous part, the separator and the second metal porous part are stacked in this order,
wherein a total thickness of the first metal porous part, the separator and the second metal porous part is 300 μm or less.

6. The fuel cell stack as claimed in claim 1, wherein the interconnector is made of a material in which electron conductivity on a side of the first fuel cell is higher than that on a side of the second fuel cell, when fuel gas including hydrogen is supplied to the first gas passage and oxidant gas including oxygen is supplied to the second gas passage.

7. The fuel cell stack as claimed in claim 6, wherein the interconnector is made of a material of which a surface is oxidized into an oxide film when the material is exposed to oxygen.

8. The fuel cell stack as claimed in claim 1, wherein a total metal ratio of a whole of the fuel cell is 70 volume % or more.

9. The fuel cell stack as claimed in claim 1,
wherein the first material and the third material have an identical composition, and
wherein the second material and the fourth material have an identical composition.

10. The fuel cell stack as claimed in claim 1, wherein the second material and the fourth material are scandia yttria stabilized zirconium oxide.

11. The fuel cell stack as claimed in claim 1, wherein the first material and the third material are a metal.

12. The fuel cell stack as claimed in claim 1, wherein the first material and the third material are $LaCrO_3$ in which Sr is doped or $SrTiO_3$ in which La is doped.

* * * * *